March 18, 1930. A. JANSSON 1,750,755
BRAKE MECHANISM
Filed June 11, 1926 5 Sheets-Sheet 1

Inventor
AXEL JANSSON
By his Attorneys
Redding, Greeley, O'Shea & Campbell

March 18, 1930.　　A. JANSSON　　1,750,755
BRAKE MECHANISM
Filed June 11, 1926　　5 Sheets-Sheet 3

Inventor
AXEL JANSSON
By his Attorneys
Redding, Greeley, O'Shea & Campbell

March 18, 1930.  A. JANSSON  1,750,755
BRAKE MECHANISM
Filed June 11, 1926  5 Sheets-Sheet 4
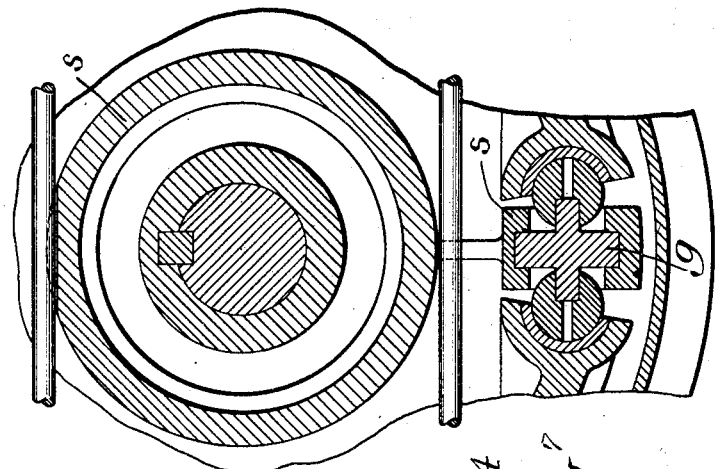
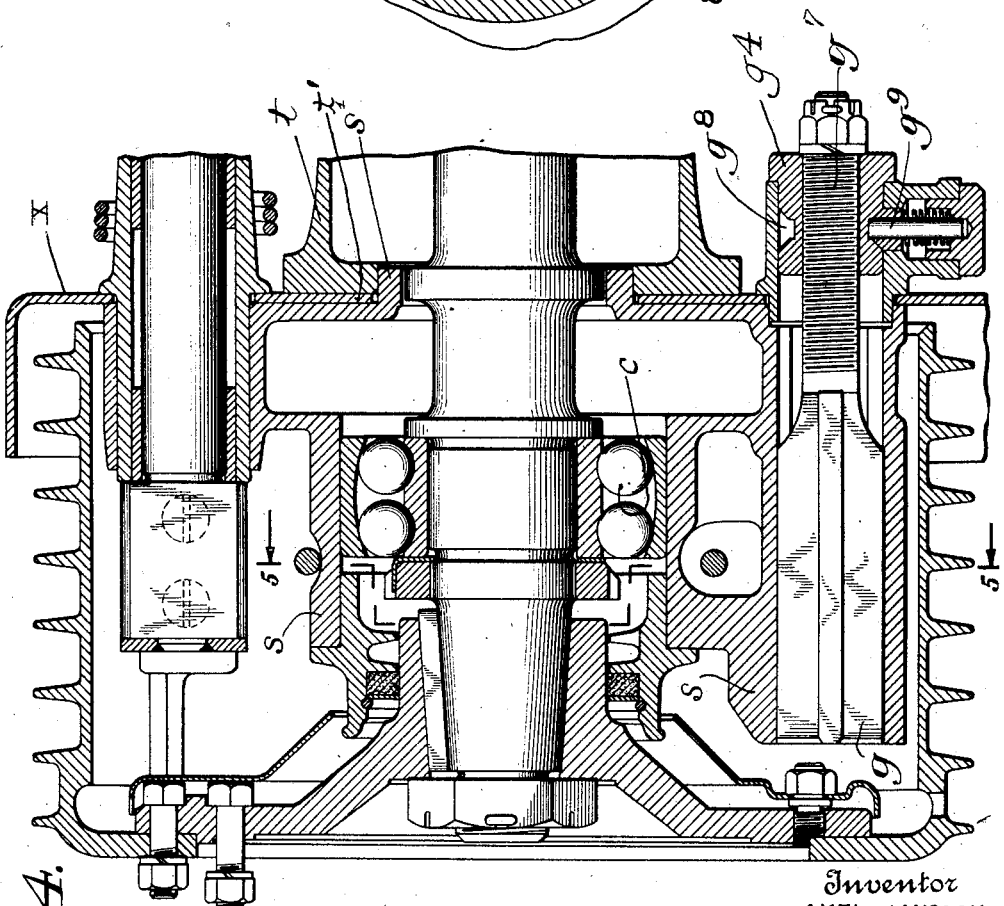
Inventor
AXEL JANSSON

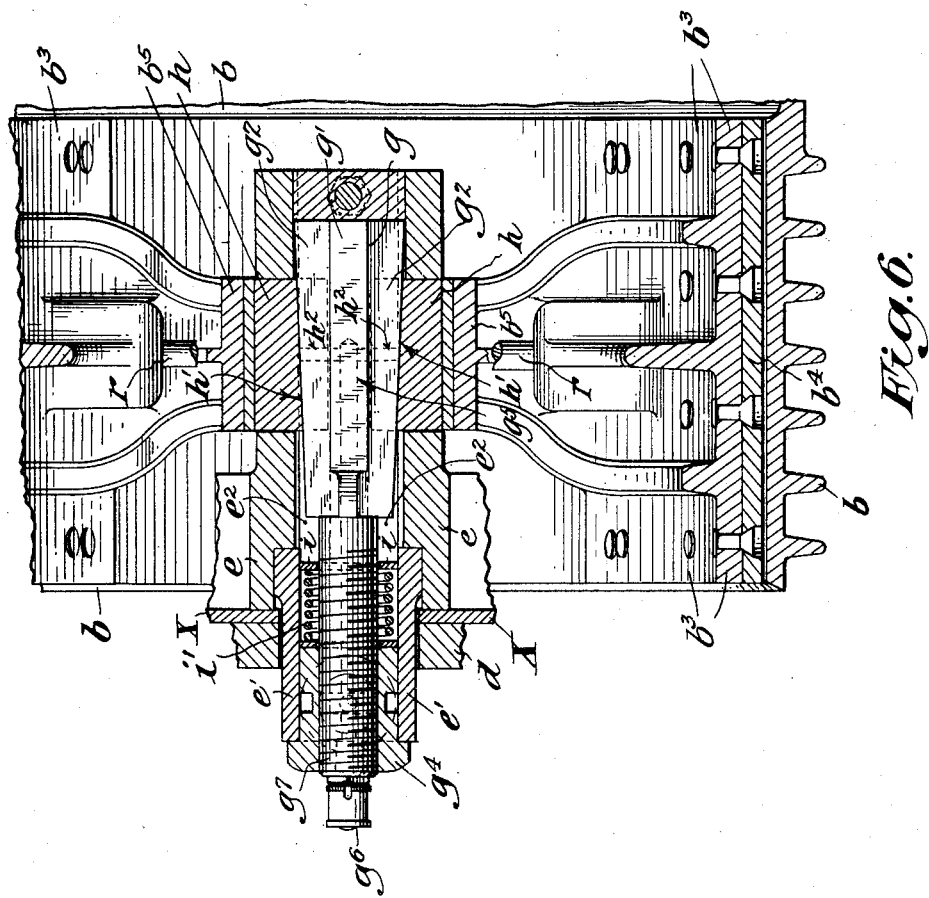

Patented Mar. 18, 1930

1,750,755

UNITED STATES PATENT OFFICE

AXEL JANSSON, OF HILLSIDE, NEW JERSEY, ASSIGNOR TO INTERNATIONAL MOTOR COMPANY, OF NEW YORK, N. Y., A CORPORATION OF DELAWARE

BRAKE MECHANISM

Application filed June 11, 1926. Serial No. 115,155.

This invention relates to brake mechanism and in some aspects more particularly to propeller shaft brakes in motor vehicles. It is an object of the present invention to effect a division of the braking effort applied to the rotating member to be retarded in the interest of a balance of the braking torque. Another object of the invention is to increase the braking forces applied to the propeller shaft in a structure which is practical from the standpoint of manufacture and use. These objects are attained by the interposition within a line of shafting, such as a propeller shaft, of a short shaft section carrying spaced brake drums at its ends supported by bearings in a frame element which is maintained against distortion at spaced points, as by spaced transverse frame members in a motor vehicle. More particularly a cylindrical frame member is adapted to support the short shaft section by means of spaced bearings and to be in turn supported from the transversely extending supporting members. The invention also seeks to so distribute the propeller shaft bearings as to support the propeller shaft at the points where the brake torque is applied. To this end the brake drums are so secured to the propeller shaft section by means of spiders as to overlie the ends of the shaft section and include, respectively, the planes of the bearings. It is a further object of the invention to provide adjustable devices for retracting the shoes from the drum at times when it is not desired to apply braking forces. To this end bolts or links connect the oppositely moving brake shoes and these links are connected to the shoes through the instrumentality of springs whereof the tension as well as the length of the links is adjustable. The invention also seeks to compensate for wear of the brake lining by adjustable bearings for the brake shoes. To this end the brake shoes are pivoted upon anchors which are relatively movable by means of an adjustable wedge so that as the brake linings wear the brake anchors may be spaced further apart. These and other objects of the invention and the means for their attainment will be more apparent from the following detailed description taken in connection with the accompanying drawings illustrating preferred embodiments of the invention in which:

Figure 4 is a view substantially similar to that indicated at the right-hand side of Figure 1 but showing a modification of the brake anchor.

Figure 5 is a fragmentary sectional view taken in the planes indicated by the broken line 5—5 in Figure 4 and looking in the direction of the arrows.

Figure 6 is a view taken along a plane indicated by the line 6—6 in Figure 3 and looking in the direction of the arrows and showing the tapered arms of the cruciform wedge member for adjusting the brake anchors.

Figure 1:
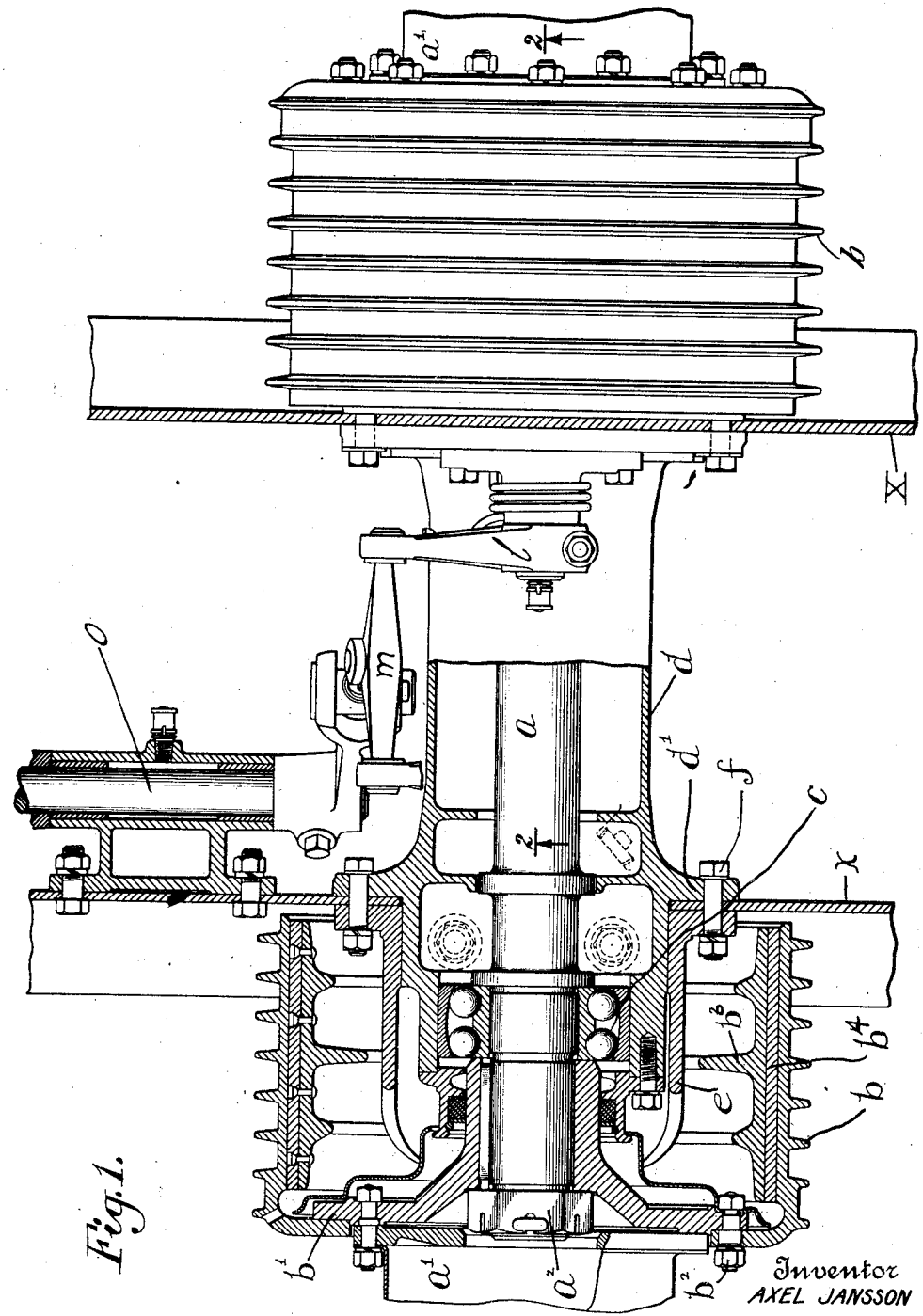
Figure 1 is a view showing, in plan, the brake mechanism according to the present invention, parts being removed in the interest of clearness to show the manner of supporting a short shaft section interposed in the propeller shafting at spaced points.
Figure 2:
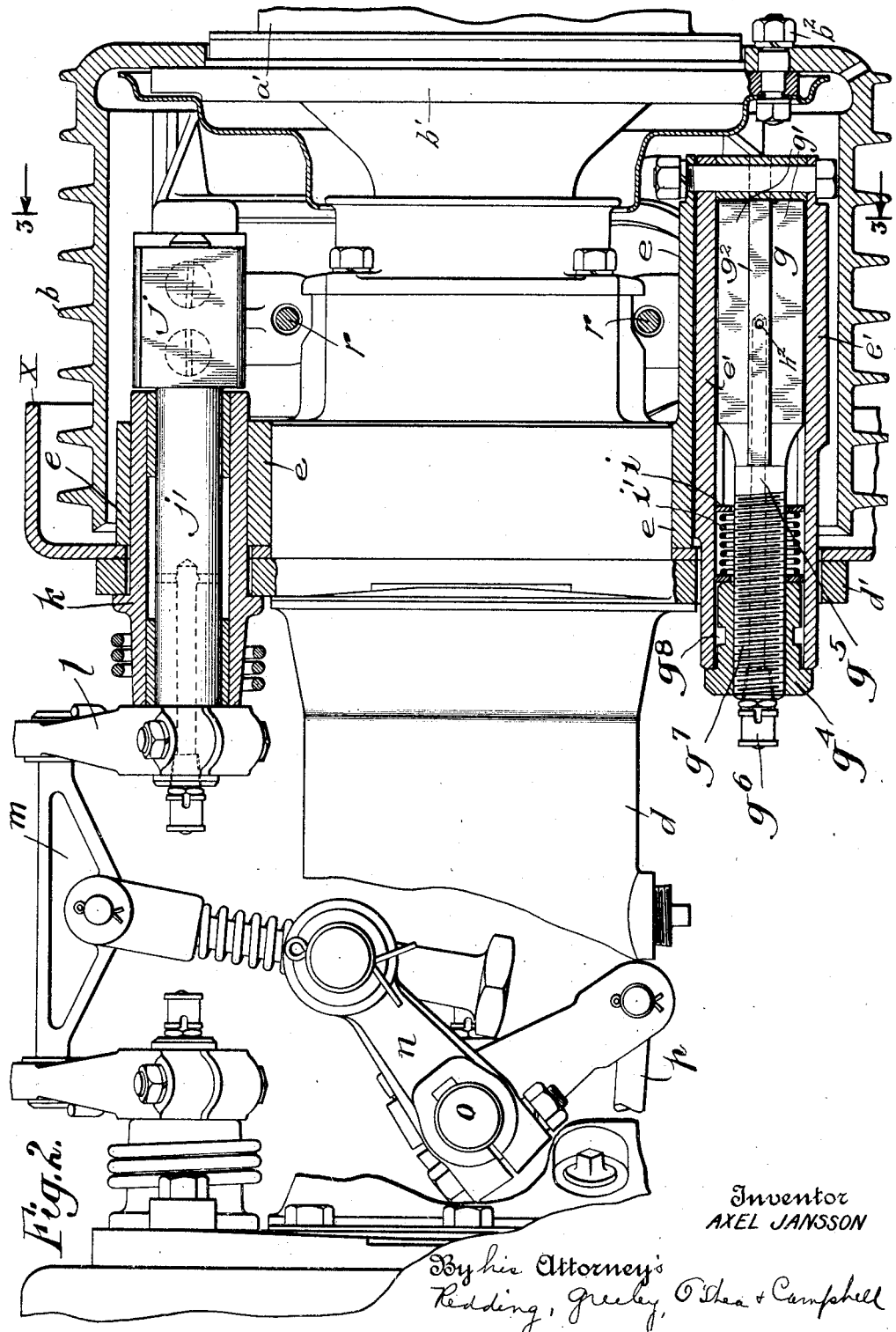
Figure 2 is a view on an enlarged scale taken in the vertical plane indicated by the line 2—2 in Figure 1, looking in the direction of the arrows and showing the devices for adjusting the brake anchors to compensate for wear of the brake lining and the actuating mechanism for the brake shoes for the respective drums.
Figure 3:
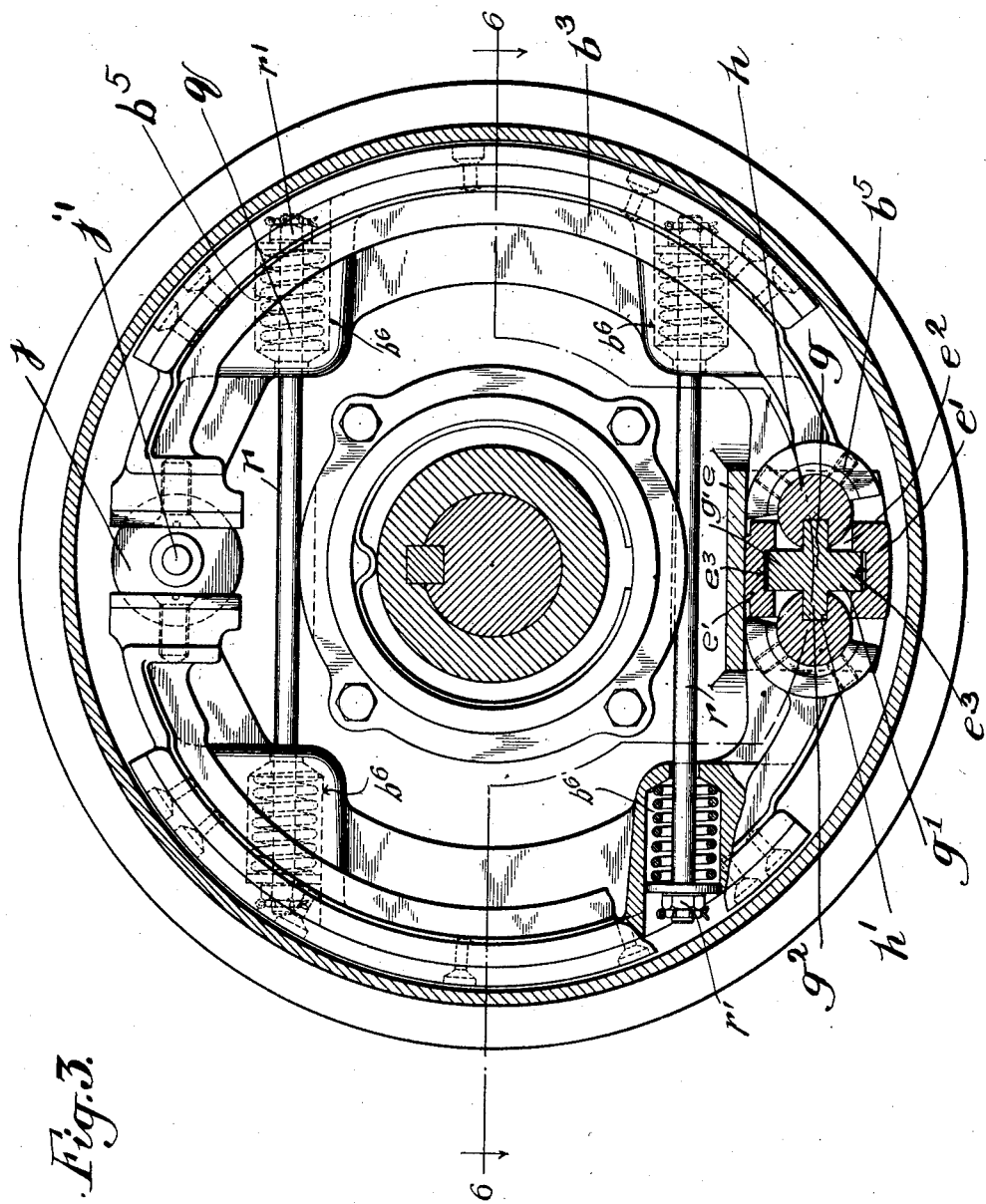
Figure 3 is a transverse vertical sectional view taken in the plane indicated by the line 3—3 in Figure 2 looking in the direction of the arrows and showing particularly the configuration of the brake anchors and adjusting devices therefor and the adjustable resilient brake shoe retracting devices.

While the invention has been illustrated as applied to the propeller shaft of a motor vehicle, it will be apparent that in many of its aspects it is not limited thereto but is applicable in any situation where a rotating element is to be retarded. In Figure 1 a short shaft section $a$ is illustrated as adapted to be interposed in the line of a propeller shaft to which it is connected by the universal joints $a'$, $a'$. The shaft section carries at its ends brake drums $b$ which are secured thereto by the spider $b'$ keyed thereon and prevented from axial displacement by the nuts $a^2$, the spiders being also availed of as securing means for the universal joints by means of the bolts $b^2$. Within the confines of the respective brake drums, the shaft is journaled in bearings $c$ in a cylindrical supporting element $d$ secured as by the flange $d'$ to spaced transverse frame members X closely positioned with respect to the brake drums. Thus the tortional stresses applied to the shaft through the brake drums are resisted by the reaction of the bearings supported within the drums. Inwardly of the brake drums are the brake shoes $b^3$, $b^3$ bearing the brake linings $b^4$ and supported generally from a cylindrical anchor member $e$ which may be secured by the same bolts $f$ which secure the flanges $d'$ of the support to the frame members X. The brake anchor also serves as a shield for the end of the support $d$. At its lowermost part, the brake anchor $e$ is formed with an extension $e'$, Figure 3, slotted as at $e^2$ and inwardly grooved as at $e^3$ to receive a cruciform wedge member $g$, the vertical arms $g'$ of the wedge member sliding in the grooves $e^3$ and the transverse arms $g^2$ being tapered and supporting the cylindrical bearing members $h$ receiving the semi-cylindrical curved ends $b^5$ of the brake shoes $b^3$. As the brake linings wear the cruciform wedge member may be drawn to the left (Figures 2 and 6) by means of the nut $g^4$ bearing upon the end of the brake anchor extension $e'$ and coacting with the threaded shank $g^7$, which is an extension from the cruciform wedge. This will cause relative movement between the oppositely directed tapered arms $g^2$ and the grooves $h'$ of the cylindrical bearings $h$ and effect their relative outward displacement. As a means of lubrication the cruciform member may be formed with an axial bore $g^5$ having an oil cup $g^6$ outwardly of the end $g^7$ and leading outwardly at its opposite end to the grooves $h^2$, the end of the recess being sealed against the escape of lubricant by the spring pressed bushing $i$ pressed into place by means of a spring $i'$ which surrounds the shank $g^7$. The brake shoes are expanded by a cam $j$ carried upon the end of a shaft $j'$ journaled in a cylindrical bearing $k$ also carried with the anchor member $e$. This shaft carries, at its outer end, an arm $l$ pivotally connected to the link member $m$ which connects the respective arms actuating the shoes of both brake drums and is centrally connected to the bell crank $n$ on the shaft $o$ journaled in a bearing carried on a cross frame member X. Actuation of the brakes may be effected either by the rotation of the shaft $o$ or by a link $p$ secured to the other end of the bell crank. In Figure 4, the fastening means for the nut are also shown. It will be observed that nut $g^4$ is formed with a peripheral groove $g^8$ adapted to receive a spring pressed plunger $g^9$ seated in an extension of the walls of the recess containing the wedge member.

The brake shoes are retracted against the action of the cam $j$ through the instrumentality of the springs $q$ bearing against links $r$ extending between the shoes. In order that the tension of each spring $q$ may be adjustable to compensate for wear and deterioration they are disposed within recesses $b^6$ formed in the brake shoes $b^3$ and bearing against nuts carried on the ends of the links. To vary the tension on the springs the nuts $r'$ are adjustable.

In Figures 4 and 5 there is illustrated a modification of the invention in which the cylindrical member terminates at the cross frame members X and the brake anchors $s$ support the bearings $c$ for the shaft section and are in turn supported by the frame. It will be noted that the cylindrical supporting element $t$, in this instance, terminates in a flange $t'$ which abuts against frame member X and is positioned by an extension $s'$ of the anchor member.

It will thus be seen that a brake mechanism has been provided wherein braking torque is applied at spaced points in a balanced structure having advantageous features from the standpoint of manufacture and use.

Various modifications may be made in the disposition and composition of the component elements of the brake mechanism without departing from the spirit and scope of the invention as set out in the appended claims.

What I claim is:

1. In brake mechanism, in combination, a brake anchor, brake shoes formed with curvilinear brake anchor bearings, cylindrical bearing members for each brake shoe formed respectively with opposed grooves of varying depth, a wedge member cruciform in cross section seated in the grooves and carried with the brake anchor and having a threaded shank, a nut carried with the shank and bearing on the brake anchor, and a spring surrounding the shank and bearing, respectively, on the nut and anchor bearing.

2. In brake mechanism, in combination, a brake anchor, brake shoes formed with curvilinear brake anchor bearings, cylindrical bearing members for each brake shoe formed respectively with opposed grooves of varying depth, a wedge member cruciform in cross section seated in the grooves and carried with the brake anchor and having a threaded shank, a nut carried with the shank and bearing on the brake anchor, a spring surrounding the shank and bearing, respectively, on the nut and anchor bearing, and an axial lubricant passage formed with outlets to the wedge members in the grooves and a closure for the passage.

This specification signed this 8th day of June A. D. 1926.

AXEL JANSSON.